United States Patent
Calo et al.

(10) Patent No.: US 9,591,085 B2
(45) Date of Patent: *Mar. 7, 2017

(54) MIGRATION OF NETWORK CONNECTION UNDER MOBILITY

(71) Applicant: International Business Machines Corporation, Armonk, NY (US)

(72) Inventors: Seraphin B. Calo, Cortlandt Manor, NY (US); Raheleh B. Dilmaghani, Elmsford, NY (US); Bong Jun Ko, Harrington Park, NJ (US); Kang-Won Lee, Nanuet, NY (US); Vasileios Pappas, Elmsford, NY (US); Ramya Raghavendra, White Plains, NY (US); Yang Song, Ossining, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/973,200

(22) Filed: Aug. 22, 2013

(65) Prior Publication Data

US 2014/0280768 A1 Sep. 18, 2014

Related U.S. Application Data

(63) Continuation of application No. 13/826,238, filed on Mar. 14, 2013.

(51) Int. Cl.
*G06F 15/16* (2006.01)
*H04L 29/08* (2006.01)
*H04L 29/06* (2006.01)

(52) U.S. Cl.
CPC .......... *H04L 67/148* (2013.01); *H04L 67/142* (2013.01); *H04L 69/18* (2013.01)

(58) Field of Classification Search
CPC ......... H04L 41/00; H04L 51/00; H04L 61/00; H04L 43/00; H04L 65/00; H04L 67/00; H04L 69/00
See application file for complete search history.

(56) References Cited

U.S. PATENT DOCUMENTS 6,041,357 A    3/2000  Kunzelman et al.
6,182,139 B1 *  1/2001  Brendel ........................ 709/226
(Continued)

FOREIGN PATENT DOCUMENTS

EP           1 446 907        8/2004

OTHER PUBLICATIONS

Le, D. et al, "A Review of Mobility Support Paradigms for the Internet", IEEE Communications Surveys & Tutorials, 2006, vol. 8, No. 1, pp. 38-51.

(Continued)

*Primary Examiner* — Hitesh Patel
(74) *Attorney, Agent, or Firm* — Scully, Scott, Murphy & Presser, P.C.; Mercedes L. Hobson Esq.

(57) ABSTRACT

The present disclosure relates generally to the field of migration (e.g., seamless migration) of a network connection under mobility (e.g., host mobility). In various examples, migration (e.g., seamless migration) of a network connection under mobility (e.g., host mobility) may be implemented in the form of methods and/or algorithms.

9 Claims, 5 Drawing Sheets

(56) References Cited

U.S. PATENT DOCUMENTS

| | | | |
|---|---|---|---|
| 6,199,110 B1* | 3/2001 | Rizvi et al. | 709/227 |
| 6,456,603 B1 | 9/2002 | Ismailov et al. | |
| 6,633,761 B1 | 10/2003 | Singhal et al. | |
| 7,509,390 B1 | 3/2009 | Raman et al. | |
| 8,260,879 B2 | 9/2012 | Chan | |
| 2004/0192298 A1* | 9/2004 | Farley | H04L 29/12216 455/432.1 |
| 2005/0038848 A1* | 2/2005 | Kaluskar et al. | 709/201 |
| 2005/0198384 A1* | 9/2005 | Ansari | H04W 36/0011 709/245 |
| 2005/0235019 A1* | 10/2005 | Yang | H04L 29/06 |
| 2008/0195740 A1* | 8/2008 | Lowell et al. | 709/229 |
| 2009/0116434 A1 | 5/2009 | Lohr et al. | |
| 2010/0303128 A1* | 12/2010 | Isley | 375/132 |
| 2011/0265174 A1 | 10/2011 | Thornton et al. | |
| 2011/0270908 A1 | 11/2011 | Kern et al. | |
| 2012/0016977 A1* | 1/2012 | Robertson et al. | 709/224 |
| 2013/0066952 A1* | 3/2013 | Colrain et al. | 709/203 |
| 2013/0086142 A1* | 4/2013 | Hampel et al. | 709/203 |
| 2013/0339533 A1* | 12/2013 | Neerincx et al. | 709/228 |
| 2014/0108638 A1 | 4/2014 | Ko et al. | |
| 2014/0280768 A1 | 9/2014 | Calo et al. | |
| 2015/0256454 A1* | 9/2015 | Schliwa-Bertling | H04W 28/10 370/392 |

OTHER PUBLICATIONS

Funato, D. et al, "TCP-R: TCP Mobility Support for Continuous Operation", ICNP, 1997, pp. 229-236.

Office Action dated Jan. 2, 2015, received in U.S. Appl. No. 13/826,238.

U.S. Office Action dated Jan. 22, 2016 issued in U.S. Appl. No. 13/826,238.

Notice of Allowance dated Nov. 22, 2016 received in parent U.S. Appl. No. 13/826,238, 15 pages.

\* cited by examiner

MIGRATION OF NETWORK CONNECTION UNDER MOBILITY

CROSS REFERENCE TO RELATED APPLICATION

This application is a continuation of U.S. patent application Ser. No. 13/826,238, filed Mar. 14, 2013 the entire content and disclosure of which is incorporated herein by reference.

BACKGROUND

The present disclosure relates generally to the field of migration (e.g., seamless migration) of a network connection under mobility (e.g., host mobility).

In various examples, migration (e.g., seamless migration) of a network connection under mobility (e.g., host mobility) may be implemented in the form of methods and/or algorithms.

DESCRIPTION OF RELATED ART

Although current network protocols like TCP (transmission control protocol) are designed to support a fixed relationship between client devices and servers, modern distributed computation is increasingly of the nature where these relationships may change. Two examples of such dynamic relationships are as follows. The first example arises in context of wireless mobile (e.g., cellular) networks. The second example is in the context of data centers using virtual machines.

In wireless mobile (e.g., cellular) networks, functions like caching, analytics, etc. can be provided by means of proxies located at cell sites. Using a traditional networking method based on TCP to serve the contents at the cell sites, however, makes it difficult to support the mobile users, who can move from a first area covered by first cell site to a second area covered by a second cell site. In a conventional method of object retrieval based on a TCP protocol, when a device moves across cell sites, its TCP connection with the proxy breaks, resulting in loss of communication. This lack of mobility support is a major impediment to support proxy functions in cell sites.

In data centers, client devices are often serviced by virtual machines which are front-ended by load-balancing network switches. Load-balancing switches, especially those operating in layer 2 and layer 3 in OSI (Open System Interconnect) network layer model, typically use a hashing scheme to spread client device requests to servers. When the number of servers changes (e.g., due to increase/decrease in the virtual machine), the hashing function can migrate a client device in mid-session to another virtual machine, resulting in a terminated connection.

Conventional solutions to migrate a client device to a different server typically depend on techniques that identify safe situations when a client device can be migrated over, but keep a client device "stuck" to the same server until such a safe situation is reached (e.g., a session is finished). This requires significant complexity as well as inefficient use of network resources.

Other conventional solutions to migrate a client device from one server to a different server synchronize the server session states between the servers before the migration and/or forward to the new server from the original server the network connection associated with the original server (see, e.g., co-pending U.S. patent application Ser. No. 13/649,534, filed on Oct. 11, 2012, entitled "Virtual Consolidated Appliance", the entire contents and disclosure of which is expressly incorporated by reference herein as if fully set forth herein).

Referring now to FIG. 1, a block diagram of a broken TCP/application session in a conventional network connection migration is shown. As seen in this FIG. 1, at step 1 a client device 101 initiates an application session with a server 103 (e.g., an edge server) by opening a TCP connection (the session is communicated through mobile phone cell site 105). At step 2, the server 103 starts transmitting the application data on the TCP connection (through mobile phone cell site 105). At step 3, the client device moves into range of another mobile phone cell site 107 during the TCP/application session of step 2. At step 4, the client device sends a TCP packet (through mobile phone cell site 107) toward new server 109 (e.g., an edge server). Finally, at step 5, server 109, not having an applicable TCP context for the client device, sends a TCP RST command (through mobile phone cell site 107) back to the client device, and the client device's connection is broken.

In another example, rather than steps 4 and 5 above, after moving into range of mobile phone cell site 107 (and out of range of mobile phone cell site 105) the client device 101 waits for data from server 103 and eventually the TCP connection times out.

SUMMARY

The present disclosure relates generally to the field of migration (e.g., seamless migration) of a network connection under mobility (e.g., host mobility).

In various examples, migration (e.g., seamless migration) of a network connection under mobility (e.g., host mobility) may be implemented in the form of methods and/or algorithms.

In one embodiment a method implemented in a computer system for migrating communication between a client device and a first server to communication between the client device and a second server is provided, the method comprising: communicating between the client device and the first server via a first communication session, wherein the first communication session has associated therewith at least one communication state; determining, by the client device, the at least one communication state; sending by the client device, to the second server, an identification of the at least one communication state that was determined by the client device; and communicating between the client device and the second server via a second communication session, wherein the second communication session is based at least in part upon the identification of the at least one communication state that was sent by the client device to the second server.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
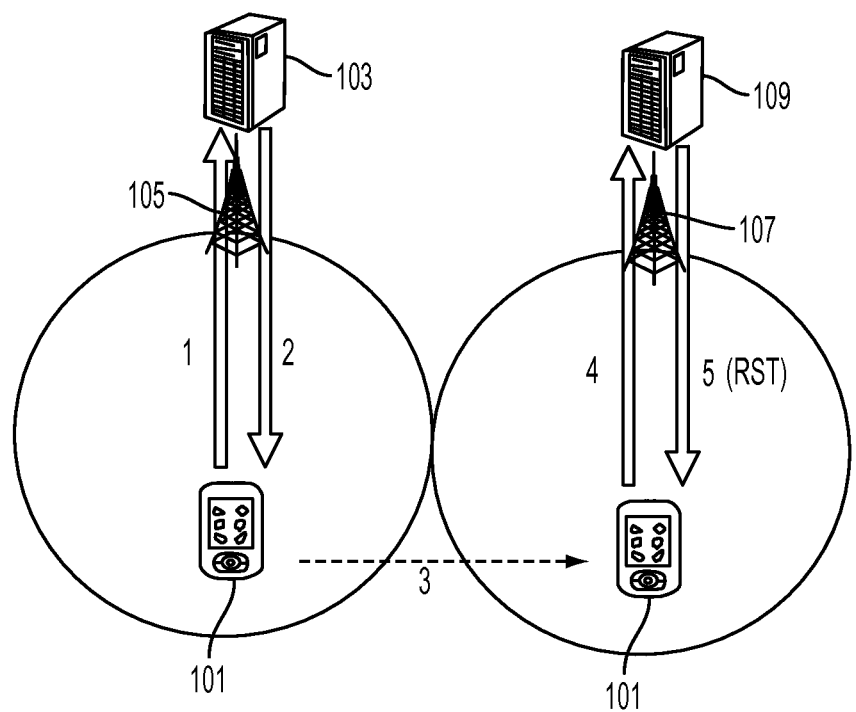
FIG. 1 depicts a block diagram of a broken TCP/application session in a conventional network connection migration.

For the purposes of description the term "real-time" is intended to refer to cause and effect occurring approximately contemporaneously in time (e.g., without significant time lag between cause and effect but not necessarily instantaneously).

For the purposes of description, the term "client device" is intended to refer to a computing device capable of communicating (directly or indirectly) with a server. In various examples, a client device may be a desktop computer or a mobile device.

For the purposes of description, the term "mobile device" is intended to refer to a client device that is designed to be portable and to be moved from place to place. In various examples, a mobile device may be a laptop computer, a tablet, or a phone (e.g., a smart phone).

For the purposes of description, the term "wireless access point" is intended to refer to a point of access for wireless communication. In various examples, a wireless access point may be a mobile telephone cell site or a Wi-Fi access point.

For the purposes of description, the term "host" is intended to refer to either a client device or a server.

In one embodiment, a client device has a TCP connection established with a first server (hereinafter sometimes referred to as "point of attachment" or "PoA") and then the client device's TCP connection and application need to be established with a second server, i.e. the PoA changes. In this embodiment, the problem of supporting the client device's application session when the client device's PoA changes in the middle of the session is solved as follows: In the first communication session, the client device requests some application data (e.g. a file or a named data) from the first server. During the first communication session, the client device determines the state of the PoA with the first server (not only the application data (or a part of it) but also the current state of TCP connection (and/or any other protocol underneath the application)). When a subsequent request is made for further application data, the client device includes the state of the TCP session in the request. In case the request ends up with another PoA (e.g., at a second server), the new PoA recreates the TCP session as well as the application data to be sent over the TCP session from the state information included in the request. For an example, the new PoA refers to the state of the application data (e.g., a file or a named data) and the current state of TCP connection included in the request sent by the client device to retrieve the requested portion of the application data from its local storage and to send the application data on the TCP packets with the requested TCP states.

In one example, embodiments may be applied to applications used to transfer static contents (e.g., FTP or HTTP file transfer). In another example, embodiments may be applied to virtually "any" application that runs on top of TCP/IP. Some specific examples include (but are not limited to): database query, LDAP (Lightweight Directory Access Protocol) directory look-ups, DNS (Domain Name System) query over TCP, FTP (File Transfer Protocol, and HTTP (Hypertext Transfer Protocol).

Figure 2:
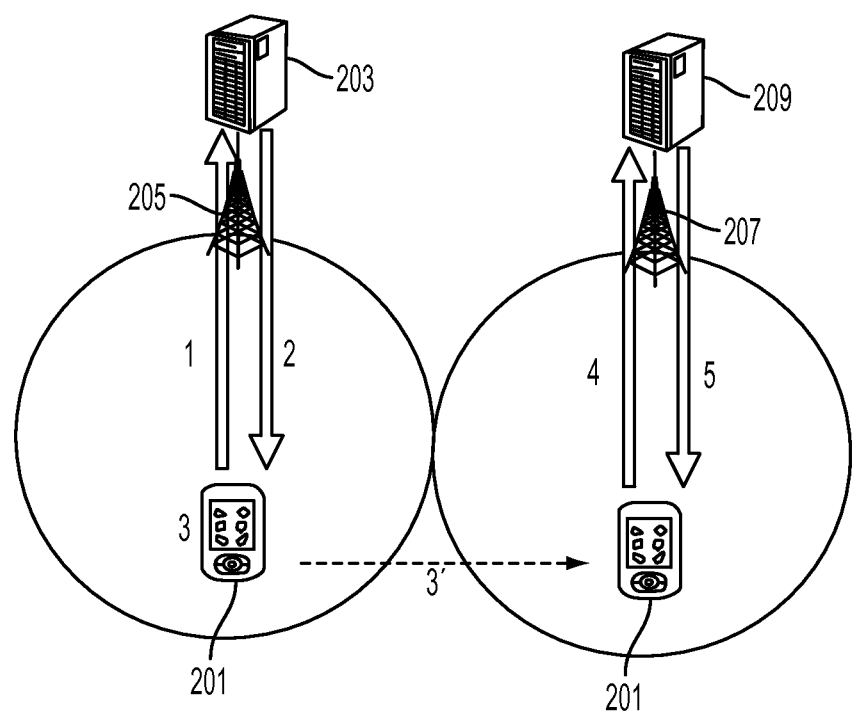
FIG. 2 depicts a block diagram of a seamless migration of network and application states according to an embodiment of the present invention.

Referring now to FIG. 2, this figure depicts a block diagram of a seamless migration of network and application states according to an embodiment of the present invention. As seen in this figure, at step 1 a client device 201 initiates an application session with a server 203 (e.g., an edge server) by opening a TCP connection (the session is communicated through mobile phone cell site 205). At step 2, the server 203 starts transmitting the application data on the TCP connection (through mobile phone cell site 205). At step 3, the client device maintains the TCP and application session state(s) of the server 203 (in one example, this may be an ongoing process). At step 3', the client device moves into range of another mobile phone cell site 207 (and out of range of mobile phone cell site 205). At step 4, the client device sends the relevant TCP/application session state(s) maintained by the client device (through mobile phone cell site 207) to the new server 209 (e.g., an edge server) on every subsequent packet (and/or based on a request message stream). At step 5, after the client device moves into range of the mobile phone cell site 207, the server 209 starts sending to the client device (through mobile phone cell site 207) the data associated with the state(s) sent by the client device to the server 209.

Reference will now be made to various client device methods according to various embodiments.

In one specific example, in the middle of a session, a client device may determine: (a) application session states including (but not limited to): (i) an identifier of the object originally requested (e.g., URL); and/or (ii) a data segment expected next (e.g., a number of bytes received so far+1); and/or (b) TCP/IP (transmission control protocol/Internet protocol) session states (e.g., available in the client device's Transmission Control Block) including (but not limited to): (i) an initial sequence number; (ii) a next sequence number; and/or (iii) a receiver window size.

In another specific example, when a location of a client device changes to communication with another server, the client device may send a MIG_REQUEST (Migration Request) message, containing (but not limited to): (a) a current application session state; (b) a current TCP session state; and/or (c) optionally, an identifier of the previous server. In another specific example, the MIG_REQUEST message may be piggybacked on every packet during the session (e.g., to handle a migration done by the network, but unknown to the client device). In another specific example, the MIG_REQUEST message may be sent when a migration is detected (e.g., if a connection migration instance is known to the client device). In another specific example, a 1-bit flag in a TCP header (e.g., one of the "Reserved" bits in the TCP header) may be used to identify the packet as the MIG_REQUEST. The servers, upon receiving a TCP packet with that 1-bit flag set, can distinguish that packet as that of type MIG_REQUEST (as opposed, for example, to a conventional TCP packet type) and process it according to the methods described herein.

As described herein, a MIG_REQUEST is a new message type (used, for example, for mobility support). Each MIG_REQUEST is a single message sent by a client including both a TCP state (associated with the TCP protocol) and an application state (associated with the application layer).

Reference will now be made to various server methods according to various embodiments.

In one specific example, each server maintains a table of TCP and application session states of the client devices it currently serves. In this example, upon receiving a MIG_REQUEST from a client device, a server discards the MIG_REQUEST if the client device is found in the table (otherwise the server sends data to the client device based upon the states identified in the MIG_REQUEST).

In another specific example, a server can in turn request the requested data (that is, the data requested by a client device) from one or more other servers (including, for example, the server from which the client device migrated away from) if the client device request cannot be served locally. In another specific example, servers may proactively share information relating to the currently held data segments in each of their local storages. In another specific example, a server may search for requested data on one or more other servers on demand. In another specific example, a server may request data from a previous server that has served a given client device.

In another example a method for client device(s) and server(s), when a server receives a TCP packet of unknown TCP contexts from a client device is as follows: (a) the server sends a SOLICIT_CONTEXT message to the client device (instead of TCP_RST (TCP Reset)); (b) the client device responds with a MIG_REQUEST message to server; and (c) the server sends data to the client device based upon the states identified in the MIG_REQUEST.

Figure 3:
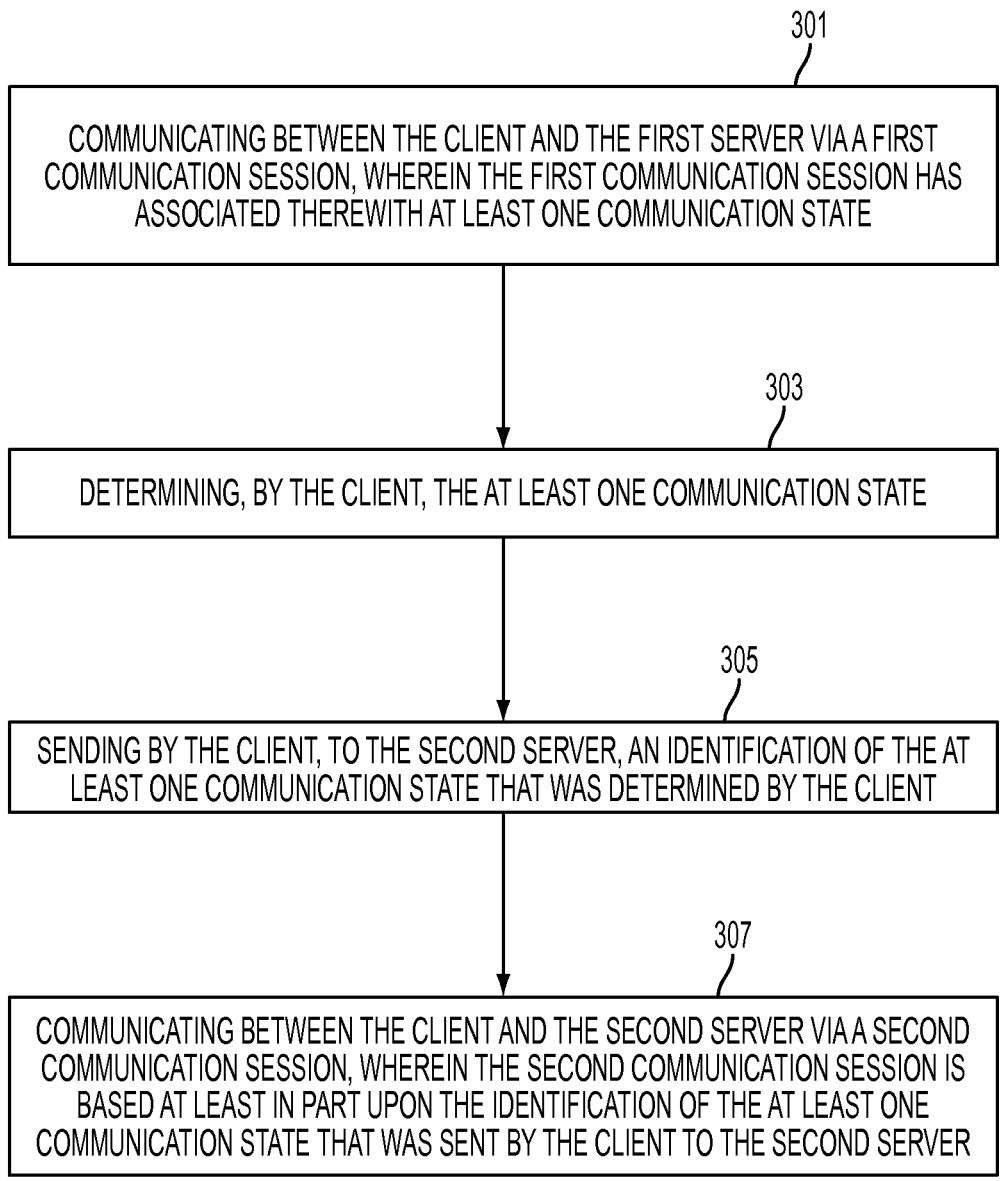
FIG. 3 depicts a flowchart of a method according to an embodiment of the present invention.

Referring now to FIG. 3, a method implemented in a computer system for migrating communication between a client device and a first server to communication between the client device and a second server is shown. As seen in this FIG. 3, the method may comprise: at step 301—communicating between the client device and the first server via a first communication session, wherein the first communication session has associated therewith at least one communication state; step 303—determining, by the client device, the at least one communication state; step 305—sending by the client device, to the second server, an identification of the at least one communication state that was determined by the client device; and step 307—communicating between the client device and the second server via a second communication session, wherein the second communication session is based at least in part upon the identification of the at least one communication state that was sent by the client device to the second server.

In one example, any steps may be carried out in the order recited or the steps may be carried out in another order.

In another example, the identification of the at least one communication state that was determined by the client device may comprise a description of the communication state and/or a description of one or more elements forming the communication state. An example message format identifying a communication state may be one using XML (Extensible Markup Language) to include the communication state within the payload of a MIG_REQUEST packet.

In another example, one or more communication states determined by the client device may be stored by the client device (e.g., locally at the client device).

Still referring to FIG. 3, any communications (e.g., first communication session, second communication session and/or sending the identification of the communication state) may be carried out via a network. Such a network may comprise the Internet, an intranet, a local area network, a wide area network and/or any other desired communication channel(s). In another example, some or all of the steps of FIG. 3 may be implemented in a computer system of the type shown in FIG. 5.

Figure 4:
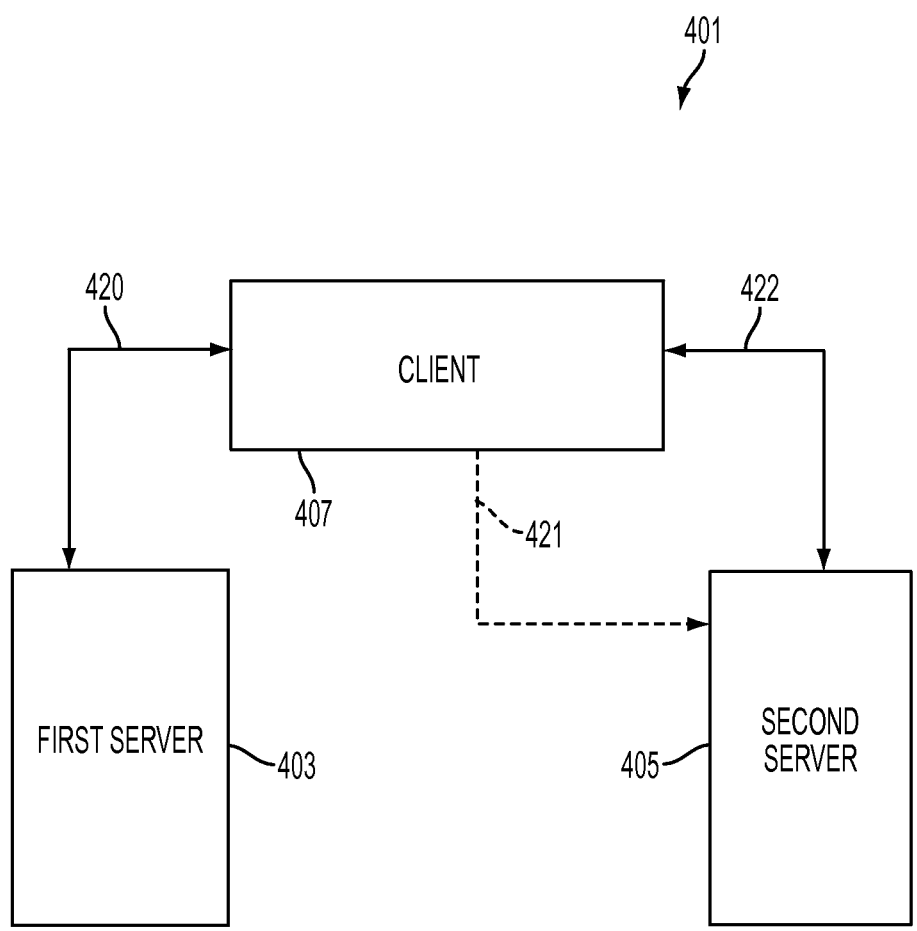
FIG. 4 depicts a block diagram of a system according to an embodiment of the present invention.

Referring now to FIG. 4, a computer-implemented system 401 for migrating communication from a first server 403 to a second server 405 is shown. As seen in this FIG. 4, the system 401 may comprise a client device 407 configured for: (a) communicating with the first server via a first communication session 420, wherein the first communication session has associated therewith at least one communication state; (b) determining the at least one communication state; and (c) sending 421 to the second server an identification of the at least one communication state that was determined by the client device; wherein the client device is further configured for communicating with the second server via a second communication session 422, wherein the second communication session is based at least in part upon the identification of the at least one communication state that was sent by the client device to the second server.

In one example, any steps may be carried out in the order recited or the steps may be carried out in another order.

In another example, the identification of the at least one communication state that was determined by the client device may comprise a description of the communication state and/or a description of one or more elements forming the communication state.

In another example, one or more communication states determined by the client device may be stored by the client device (e.g., locally at the client device).

Still referring to FIG. 4, any communications (e.g., first communication session, second communication session and/or sending the identification of the communication state) may be carried out via a network. Such a network may comprise the Internet, an intranet, a local area network, a wide area network and/or any other desired communication channel(s). In another example, some or all of the elements of FIG. 4 may be implemented in a computer system of the type shown in FIG. 5.

Of note, conventional communication protocols in networks are typically designed to be layered. Thus, under a conventional mechanism, a client device would send a request to a server which consists of a request at an application layer, which runs on top of a TCP layer, which in turns runs on a connectionless IP layer. TCP is a stateful protocol. As a result, under a conventional mechanism, when the server changes from one PoA to another PoA, the TCP "breaks", and the application "breaks" as well.

In this regard, reference will now be made to additional details according to an embodiment. In this embodiment, the general architecture consists of a client device getting attached to a server at one time and then the attached server changing. For example, a client device is initially attached to a server at PoA1. Then the client device gets attached to a second server at PoA2 in the middle of an information exchange session.

In one example, the state of the TCP connection (and in general any state of the network layers underneath the application layer) may be determined by the client device at PoA1. In subsequent application level requests, the state of the network layer is included by the client device. In the case where the server changes from PoA1 to PoA2, the server at PoA2 is able to recreate the request state on its side, and thereby support the request by re-establishing the TCP state (and/or any other underlying protocols) at the new server at PoA2 on the basis of the state information carried in the client device request.

In the specific context of cellular networks, where the servers are, for example, edge servers located at the cell sites and the client devices are used by mobile users, an example system would work as described below.

In this example, the architecture that supports the mobile users' content retrieval consists of a plurality of edge servers (hereinafter sometimes referred to as "ESs") placed at the edge of the cellular networks (e.g., cell sites or base stations), which serve the content requests from the mobile users' mobile devices (hereinafter sometimes referred to as "MDs") that request the content, sometimes in the form of data objects (e.g., content such as file(s), video stream, named data, etc.) that can be served by the edge servers.

In one example, each of the edge servers keeps some set of the data objects at its segment level in its local storage (e.g., cache), and delivers the pieces to mobile users that request the data. Additionally, the edge servers maintain the network between them, such that each of the edge servers maintains the knowledge base of which other edge servers have the pieces of the data that it does not have, and requests those pieces from one or more other edge servers that have those pieces in their local storage upon receiving the requests for those pieces from mobile users or other edge servers.

In one example of a conventional TCP/IP-based object retrieval method, when the mobile device's PoA changes (e.g., hands over) from one edge server to another during a transfer of a data object, since the new PoA edge server does not have the necessary TCP/IP state and application layer context for the object transfer between the mobile device and the previous PoA edge server, the mobile device cannot continue to retrieve the same data object from the new PoA ES.

As a specific example of a conventional process, suppose an MD started downloading a file of 100 MByte in size from an edge server ES1 by sending an HTTP (Hyper Text Transfer Protocol) request message on top of TCP protocol, and the MD has moved out of the range that is covered by ES1 and moved into the range covered by another edge server ES2 while MD has downloaded only a half (50 Mbytes) of the file. Because a TCP connection has been maintained between MD and ES1 for transferring the file, when MD is moved into the area of ES2, either of two things can happen: (i) an Acknowledgement (ACK) packet from MD is sent to ES2 as a response to one (or more) TCP segment(s) MD received from ES1, or (ii) MD continues to wait for receiving the rest of the file from MD2. In the case of (i), since ES2 does not have any TCP state information associated with the ACK packet sent by MD, ES2 will either send the TCP RST (Reset) packet to MD, causing the TCP connection to be closed. In the case of (ii) the TCP connection will eventually time out and the connection will be closed. In either case, the MD is forced to stop downloading the file, and has to reopen the TCP connection to request and download the same file again from the new PoA ES. In the case of (ii) in particular, where the new PoA ES is not aware of the context of the MD's connection for downloading the file, the MD is forced to wait until the connection timeout occurs (typically in the order of minutes) for it to notice the hand-over to new PoA.

Thus, in one embodiment, a mechanism for supporting mobile devices for the content retrieval from edge servers, to enable mobile devices to continue to download the data object even after the MD hands over to a new PoA without causing the transport connection to be closed, comprises the following: (1) The mobile device determines and maintains the up-to-date state of the TCP layer and application layer for the ongoing transmission of the object being transmitted by the original edge server. The TCP state can be either inferred by the client device (e.g., from receiver-side Transmission Control Block in TCP protocol layer), or sent by the original edge server. (2) The mobile device periodically sends MIG_REQUESTS for the data segments in the uplink direction. These MIG_REQUESTS contain (i) the information regarding the data segments in the application layer that the mobile device is currently expecting to receive yet has not received yet from the original edge server, (ii) the information regarding the transport protocol layer's state associated with this application layer information, and optionally (iii) the identifier of the original PoA edge server. (3) Each edge server maintains a table ("connection table") of the transport layer connections and application layer state of the connections for the mobile devices that it currently serves. When an edge server receives a MIG_REQUEST from a mobile device, the edge server performs one of the following procedures: (a) If the connection and application state specified in the MIG_REQUEST is found in the table of currently served connections, the edge server disregards the MIG_REQUEST. (b) If the corresponding state does not exist in its current connection table and the requested data segments are in local storage, the edge server starts sending the segments of the object in the application layer using the transport layer state information specified in the MIG_REQUEST. (c) If the corresponding state does not exist in its current connection table and the requested data segments are not in local storage, the edge server requests the requested data segments from the previous (original) PoA edge server specified in the MIG_REQUEST (e.g., through a wired network between the edge servers), and sends those data segments to the mobile device using the transport layer state information specified in the MIG_REQUEST.

In various embodiments, the state information in 1 and 2 above (or communication state information), maintained by the mobile device and periodically sent by the mobile device to the edge server comprises the following, in the case that a TCP protocol is used as the transport protocol: (a) The identifier of the application data object, e.g., URI (Universal Resource Identifier); (b) The offset position of the data object that is expected to be received in the number of bytes from the beginning of the file (i.e., the number of bytes received so far); and (c) The TCP connection state, such as the initial sequence number, the next sequence number associated with the next data segment being expected, and (optionally) the current receiver window size; that is, the TCP connection state information in MIG_REQUESTS is equivalent to what is included in the Acknowledgement packet.

In various embodiments, the format of the MIG_REQUEST message in 2 above uses the existing TCP packet format, where: (a) a 1-bit flag in the TCP header is used to specify the packet as the MIG_REQUEST. (b) The current TCP state information (i.e., the same information that would be included in normal ACK packets) is included in the TCP header. (c) The application data offset information is included in the TCP payload.

In another embodiment, the sending of the MIG_REQUEST message in 2 above comprises one or more of the following: (a) Mobile device sends one or more MIG_REQUESTS after a period of inactivity from the current PoA edge server. (b) The mobile device sends the MIG_REQUEST(s) when it receives a TCP RST packet from the new PoA edge server. (c) Mobile device sends the MIG_REQUEST(s) when it detects the change in PoA by the network and link layer state information (e.g., the handover states in a cellular wireless network).

In another embodiment, the requesting segments of data objects by an edge server from other edge server(s) comprises the following, particularly when the identifier of the current PoA edge server is not included in the MIG_REQUESTS from the mobile device: (a) The edge servers maintain an overlay network between themselves, and each announces the segments or ranges of the data objects that it stores in its local storage. (b) The edge servers learn the data segment or range information of the data objects announced by other edge servers, and how to reach required data segments through the overlay network (through distributed protocols such as distance vector, link state, path vector protocol, etc., or through centralized routing services). (c) When requested data segments do not exist in the local storage, each edge server sends the request for the requested data segments through the overlay network toward other edge server(s) that have the requested data segments.

The process is shown illustratively for an example where HTTP over TCP/IP is used to transfer a file, named "foo.mpg" of a size 100 MByte from the edge servers to the mobile devices: (a) A Mobile device MD opens a TCP connection to an edge server ES1, and sends an HTTP request for "foo.mpg" file over the TCP connection. The initial sequence number for the TCP connection is 1. (b) ES1 starts sending the file "foo.mpg" from its local storage over the TCP connection to MD. (c) At every 5 second interval, MD sends a MIG_REQUEST to ES1, which contains the TCP receiver state information (initial sequence number, the next sequence number, and receiver window size), the identifier (or the name) of the file "foo.mpg", the application data segment being expected next (i.e., the number of bytes of "foo.mpg" received thus far, plus 1), and (optionally) IP address of ES1. ES1 discards these MIG_REQUESTS because it has the same, active connection with MD. (d) When 50 MByte of "foo.mpg" has been transmitted to MD, and the latest ACK packet has been sent to ES1, MD hands over to the range covered by another edge server ES2. (e) Within 5 seconds after MD's hand-over, MD sends a MIG_REQUEST to ES2. Because ES2 does not have the corresponding connection state with MD, it recognizes MD requesting data segments in the previous connection with some other edge server. ES2 then creates a connection state using the state information contained in the MIG_REQUEST. (f) If the requested data segments exist in its local storage, ES2 starts sending the requested segments, starting from the next TCP sequence number. (g) If the requested data segments do not exist in its local storage, ES2 either: (i) requests the data segments from ES1 if ES1 can be identified (e.g., in the wired network between edge servers from the PoA edge server information in the MIG_REQUEST); or (ii) requests the data segments from some other edge server over the overlay network between edge servers. When receiving the requested data segments, ES2 sends the segments to MD using the TCP connection state information in the corresponding connection table.

As described herein, various embodiments may be applied in the context of converged communications, mobile applications, network equipment, protocols (network or other), user devices/interfaces, computer systems networks and/or network management/security.

As described herein, mechanisms are provided for seamless migration of a TCP/network session from one server to another. In various examples, a client device may determine a state of a TCP session from a first server and transmit the state of the TCP session to a second server so as to resume the TCP session seamlessly at the second server.

As described herein, mechanisms are provided to enable the migration of a network connection from an initial endpoint (or node) to a target endpoint (or node) without the coordination of these two endpoints. The migration may happen by enabling the client endpoint (or node) to access its connection state information directly from the initial endpoint and then transfer this state to the target endpoint, avoiding any direct communication between the initial and the target endpoints.

Figure 5:
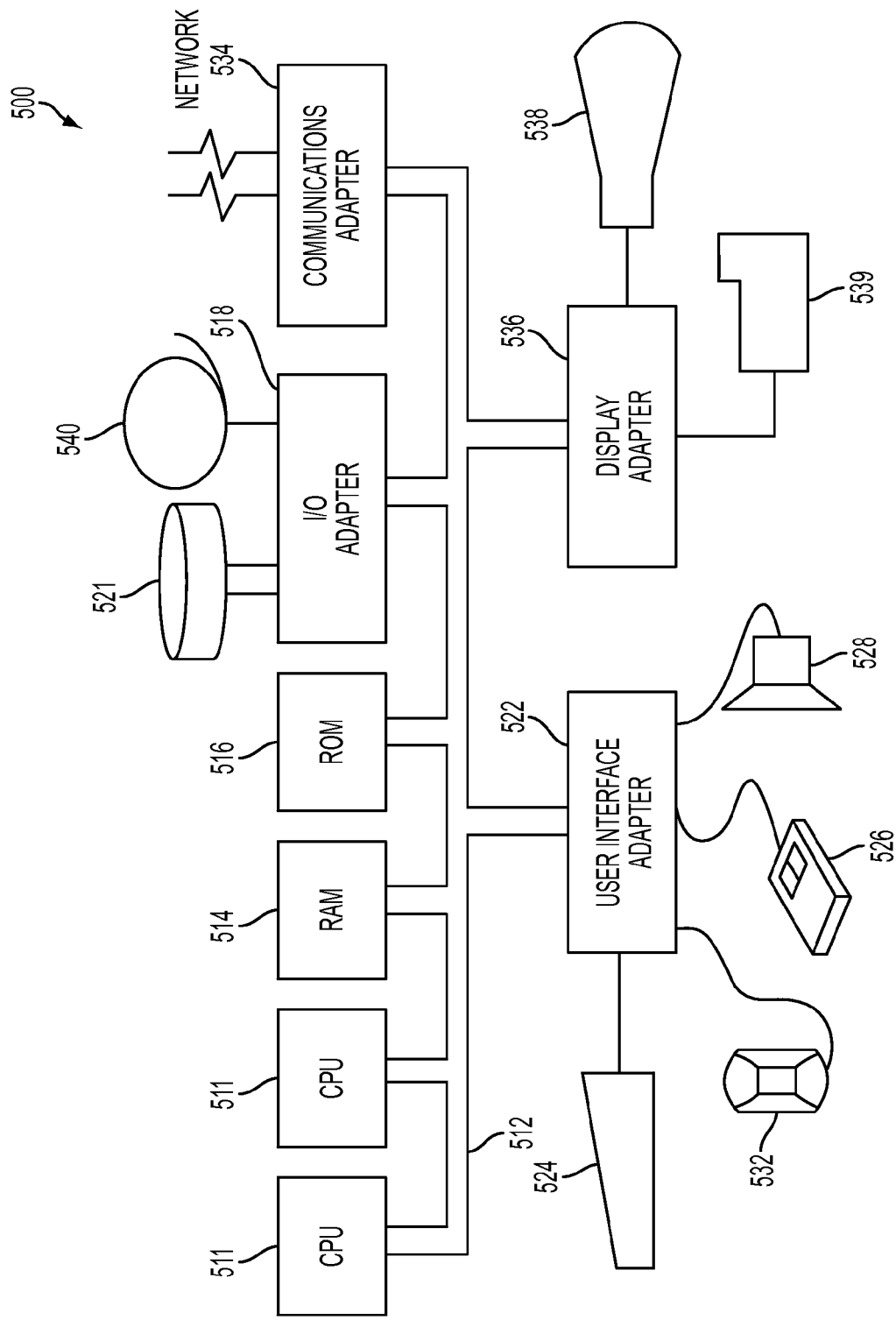
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

In one embodiment a method implemented in a computer system for migrating communication between a client device and a first server to communication between the client device and a second server is provided, the method comprising: communicating between the client device and the first server via a first communication session, wherein the first communication session has associated therewith at least one communication state; determining, by the client device, the at least one communication state; sending by the client device, to the second server, an identification of the at least one communication state that was determined by the client device; and communicating between the client device and the second server via a second communication session, wherein the second communication session is based at least in part upon the identification of the at least one communication state that was sent by the client device to the second server.

In one example, the communicating between the client device and the first server via the first communication session is initiated by the client device.

In another example, the communicating between the client device and the second server via the second communication session is initiated by the client device.

In another example, the communicating between the client device and the second server via the second communication session comprises, prior to the second server responding to the client device initiating the second communication session, the second server establishing a second communication state associated with the second communication session to be substantially identical to the first communication state associated with the first communication session.

In another example, the at least one communication state is a transmission state.

In another example, the first communication session has associated therewith at least a first protocol, wherein the second communication session has associated therewith at least a second protocol, and wherein the first protocol and the second protocol are the same.

In another example, each of the first protocol and the second protocol is a network layer protocol.

In another example, the network layer protocol is a TCP protocol.

In another example, each of the first communication session and the second communication session is an application level session.

In another example, the sending by the client device, to the second server, the identification of the at least one communication state that was determined by the client device further comprises asynchronously repeatedly sending by the client device to the second server, in a series of packets, the identification of the at least one communication state that was determined by the client device.

In another example, the method further comprises: determining by the client device, at each of a plurality of points in time, the at least one communication state; and sending by the client device, to the second server, the identification of the at least one communication state that was determined by the client device at a most recent one of the points in time.

In another example, the client device is a mobile device.

In another example: the mobile device communicates with the first server via a first mobile phone cell site; and the mobile device communicates with the second server via a second mobile phone cell site.

In another example, the communication is migrated from between the client device and the first server to between the client device and the second server as a result of at least one of: (a) load-balancing; and (b) a virtual machine process.

In another example, the method further comprises: determining, by the client device, when the communication between the client device and the first server via the first communication session migrates to the communication between the client device and the second server via the second communication session; wherein the client device sends, to the second server, the identification of the at least one communication state that was determined by the client device after the client device determines that the communication between the client device and the first server via the first communication session has migrated to the communication between the client device and the second server via the second communication session.

In another embodiment a computer readable storage medium, tangibly embodying a program of instructions executable by the computer for migrating communication between a client device and a first server to communication between the client device and a second server is provided, the program of instructions, when executing, performing the following steps: communicating, between the client device and the first server via a first communication session, wherein the first communication session has associated therewith at least one communication state; determining, by the client device, the at least one communication state; sending by the client device, to the second server, an identification of the at least one communication state that was determined by the client device; and communicating between the client device and the second server via a second communication session, wherein the second communication session is based at least in part upon the identification of the at least one communication state that was sent by the client device to the second server.

In one example, the communicating between the client device and the first server via the first communication session is initiated by the client device.

In another example, the communicating between the client device and the second server via the second communication session is initiated by the client device.

In another example, the communicating between the client device and the second server via the second communication session comprises, prior to the second server responding to the client device initiating the second communication session, the second server establishing a second communication state associated with the second communication session to be substantially identical to the first communication state associated with the first communication session.

In another example, the at least one communication state is a transmission state.

In another example, the first communication session has associated therewith at least a first protocol, wherein the second communication session has associated therewith at least a second protocol, and wherein the first protocol and the second protocol are the same.

In another example, each of the first protocol and the second protocol is a network layer protocol.

In another example, the network layer protocol is a TCP protocol.

In another example, each of the first communication session and the second communication session is an application level session.

In another example, the sending by the client device, to the second server, the identification of the at least one communication state that was determined by the client device further comprises asynchronously repeatedly sending by the client device to the second server, in a series of packets, the identification of the at least one communication state that was determined by the client device.

In another example, the program of instructions, when executing further performs the following steps: determining by the client device, at each of a plurality of points in time, the at least one communication state; and sending by the client device, to the second server, the identification of the at least one communication state that was determined by the client device at a most recent one of the points in time.

In another example, the client device is a mobile device.

In another example: the mobile device communicates with the first server via a first mobile phone cell site; and the mobile device communicates with the second server via a second mobile phone cell site.

In another example, the communication is migrated from between the client device and the first server to between the client device and the second server as a result of at least one of: (a) load-balancing; and (b) a virtual machine process.

In another example, the program of instructions, when executing, further performs: determining, by the client device, when the communication between the client device and the first server via the first communication session migrates to the communication between the client device and the second server via the second communication session; wherein the client device sends, to the second server, the identification of the at least one communication state that was determined by the client device after the client device determines that the communication between the client device and the first server via the first communication session has migrated to the communication between the client device and the second server via the second communication session.

In another embodiment computer-implemented system for migrating communication from a first server to a second server is provided, the system comprising: a client device configured for: (a) communicating with the first server via a first communication session, wherein the first communication session has associated therewith at least one communication state; (b) determining the at least one communication state; and (c) sending to the second server an identification of the at least one communication state that was determined by the client device; wherein the client device is further configured for communicating with the second server via a second communication session, wherein the second communication session is based at least in part upon the identification of the at least one communication state that was sent by the client device to the second server.

In one example, the client device is further configured for initiating the communicating between the client device and the first server via the first communication session.

In another example, the client device is further configured for initiating the communicating between the client device and the second server via the second communication session.

In another example, the second server is configured for communicating between the client device and the second server via the second communication session by establishing, prior to the second server responding to the client device initiating the second communication session, a second communication state associated with the second communication session to be substantially identical to the first communication state associated with the first communication session.

In another example, the at least one communication state is a transmission state.

In another example, the first communication session has associated therewith at least a first protocol, wherein the second communication session has associated therewith at least a second protocol, and wherein the first protocol and the second protocol are the same.

In another example, each of the first protocol and the second protocol is a network layer protocol.

In another example, the network layer protocol is a TCP protocol.

In another example, each of the first communication session and the second communication session is an application level session.

In another example, the client device is further configured for asynchronously repeatedly sending to the second server, in a series of packets, the identification of the at least one communication state that was determined by the client device.

In another example, the client device is further configured for: determining at each of a plurality of points in time the at least one communication state; and sending to the second server the identification of the at least one communication state that was determined by the client device at a most recent one of the points in time.

In another example, the client device is a mobile device.

In another example: the mobile device communicates with the first server via a first mobile phone cell site; and the mobile device communicates with the second server via a second mobile phone cell site.

In another example, the communication is migrated from between the client device and the first server to between the client device and the second server as a result of at least one of: (a) load-balancing; and (b) a virtual machine process.

In another example, the client device is further configured for: determining when the communication between the client device and the first server via the first communication session migrates to the communication between the client device and the second server via the second communication session; wherein the client device sends, to the second server, the identification of the at least one communication state that was determined by the client device after the client device determines that the communication between the client device and the first server via the first communication session has migrated to the communication between the client device and the second server via the second communication session.

As described herein, various embodiments may be applied when a TCP/IP client device's network connection is migrated from one server to another in mid-session of the TCP and application and the client device's original TCP connection and application session are "broken" (e.g., various examples may be applied in the context of mobile networks and/or load-balancing in data centers).

As described herein, various mechanisms are provided wherein a TCP session state can migrate seamlessly to a new virtual machine, even if association of a client device to a virtual machine changes mid-session. As described herein, in various embodiments mechanisms may be provided to permit: (a) a client device to determine, mid-session, the states of all applicable network layer(s) and all applicable application(s) of the server; (b) the client device to send these determined state(s) to a new server to which the client device is migrated; (c) the new server to respond to the client device based upon the state(s) sent by the client device. In one example, various embodiments may be applied not only to the TCP protocol, but also (or instead) to other stateful protocols. In another example, various embodiments do not require server-to-server synchronization or connection forwarding.

As described herein, various mechanisms are provided to allow a connection to migrate seamlessly to a new server/cell site (e.g., in real-time without any delay or without any significant delay).

In another example, a mechanism for seamlessly changing a server to which a client device is attached in a communication network comprises: the client device initiating an application level session with a first server; the client device determining the transmission state of all network layer protocols in its application level session; the client device sending the state of all network layers in its application level session to a second server; and the second server re-establishing the state of the network layers prior to responding to the client device.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function (s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer system for migrating communication between a client device and a first server to communication between the client device and a second server, the method comprising:
   communicating between the client device and the first server via a first communication session, wherein the first communication session has associated therewith at least one communication state;
   determining, by the client device, the at least one communication state;
   sending by the client device, to the second server, an identification of the at least one communication state that was determined by the client device, wherein the identification of the at least one communication state that was determined by the client device is sent in a packet that has a reserved 1-bit flag in a TCP header set so as to identify the packet as distinguishable with respect to the information contained therein, and wherein the packet includes both a TCP state associated with a TCP protocol and an application state associated with an application layer, said application state includes information regarding data segments in the application layer that client device is currently expecting to receive but has not yet received including an identification of an application data object and an offset position of the application data object expected to be received in the number of bytes from a beginning of a downloaded object, said application data object offset position being included in a TCP payload of the packet; and
   communicating between the client device and the second server via a second communication session, wherein the second communication session is based at least in part upon the identification of the at least one communication state that was sent by the client device to the second server, wherein the communication is migrated from between the client device and the first server to between the client device and the second server as a result of at least one of: (a) load-balancing; and (b) a virtual machine process.

2. The method of claim 1, wherein the communicating between the client device and the first server via the first communication session is initiated by the client device.

3. The method of claim 1, wherein the communicating between the client device and the second server via the second communication session is initiated by the client device.

4. The method of claim 3, wherein the communicating between the client device and the second server via the second communication session comprises, prior to the second server responding to the client device initiating the second communication session, the second server establishing a second communication state associated with the second communication session to be substantially identical to the first communication state associated with the first communication session.

5. The method of claim 1, wherein the sending by the client device, to the second server, the identification of the at least one communication state that was determined by the client device further comprises asynchronously repeatedly sending by the client device to the second server, in a series of packets, the identification of the at least one communication state that was determined by the client device.

6. The method of claim 1, further comprising:

determining by the client device, at each of a plurality of points in time, the at least one communication state;

sending by the client device, to the second server, the identification of the at least one communication state that was determined by the client device at a most recent one of the points in time.

7. The method of claim 1, wherein the client device is a mobile device.

8. The method of claim 7, wherein:

the mobile device communicates with the first server via a first mobile phone cell site; and the mobile device communicates with the second server via a second mobile phone cell site.

9. The method of claim 1, further comprising:

determining, by the client device, when the communication between the client device and the first server via the first communication session migrates to the communication between the client device and the second server via the second communication session;

wherein the client device sends, to the second server, the identification of the at least one communication state that was determined by the client device after the client device determines that the communication between the client device and the first server via the first communication session has migrated to the communication between the client device and the second server via the second communication session.

\* \* \* \* \*